(12) United States Patent
Higgins et al.

(10) Patent No.: US 7,951,325 B2
(45) Date of Patent: *May 31, 2011

(54) METHODS OF IMPLEMENTING A WATER-COOLING SYSTEM INTO A BURNER PANEL AND RELATED APPARATUSES

(75) Inventors: Christopher K. Higgins, Kennesaw, GA (US); Serban Cantacuzene, Houston, TX (US); Yury Eyfa, Smyrna, GA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 373 days.

This patent is subject to a terminal disclaimer.

(21) Appl. No.: 11/488,449

(22) Filed: Jul. 17, 2006

(65) Prior Publication Data

US 2007/0267787 A1    Nov. 22, 2007

Related U.S. Application Data

(60) Provisional application No. 60/801,176, filed on May 17, 2006.

(51) Int. Cl.
    *F27D 1/12* (2006.01)
    *C21C 1/00* (2006.01)
(52) U.S. Cl. ........ 266/241; 266/216; 266/217; 266/218; 266/225; 373/63; 373/75; 373/76; 373/79
(58) Field of Classification Search .......... 266/216–218, 266/225, 241; 373/60–66, 71–76, 79
    See application file for complete search history.

(56) References Cited

U.S. PATENT DOCUMENTS

| | | | |
|---|---|---|---|
| 1,668,705 A | 6/1927 | Wheelwright |
| 4,622,007 A | 11/1986 | Gitman |
| 4,637,034 A | 1/1987 | Grageda |
| 4,703,336 A | 10/1987 | Ovshinsky et al. |
| RE33,464 E | 11/1990 | Gitman |
| 4,979,896 A | 12/1990 | Kinoshita |
| 5,166,950 A | 11/1992 | Jouvaud et al. |
| 5,327,453 A | 7/1994 | Arthur et al. |
| 5,373,530 A | 12/1994 | Perrin |
| 5,426,664 A | 6/1995 | Grove |
| 5,444,733 A | 8/1995 | Coassin et al. |
| 5,471,495 A | 11/1995 | Berger et al. |
| 5,554,022 A | 9/1996 | Nabors et al. |
| 5,561,685 A | 10/1996 | Lehr et al. |
| 5,599,375 A | 2/1997 | Gitman |
| 5,740,196 A | 4/1998 | Johnson et al. |
| 5,772,430 A | 6/1998 | Pavlicevic et al. |
| 5,802,097 A | 9/1998 | Gensini et al. |
| 6,104,743 A | 8/2000 | Nomura et al. |
| 6,137,823 A | 10/2000 | Johnson et al. |

(Continued)

FOREIGN PATENT DOCUMENTS

CN    1492209    4/2004

(Continued)

*Primary Examiner* — Scott Kastler
*Assistant Examiner* — Brian Walck
(74) *Attorney, Agent, or Firm* — Christopher J. Cronin

(57) ABSTRACT

The present invention generally relates to apparatuses and methods for use in metal melting, refining and/or other processing, such as, for example, steel making in an electric arc furnace (EAF), and more particularly, to improved burner panels and related methods for the introduction of various energy sources, such as, for example, chemical energy and particulates.

13 Claims, 13 Drawing Sheets

U.S. PATENT DOCUMENTS

| | | | |
|---|---|---|---|
| 6,212,218 | B1 | 4/2001 | Shver |
| 6,280,681 | B1 | 8/2001 | MacRae |
| 6,289,035 | B1 | 9/2001 | Shver |
| 6,290,035 | B1 | 9/2001 | Kazmirski et al. |
| 6,342,086 | B1 | 1/2002 | Shver |
| 6,372,010 | B1 | 4/2002 | Shver et al. |
| 6,440,747 | B2 | 8/2002 | Althaus |
| 6,563,855 | B1 | 5/2003 | Nishi et al. |
| 6,580,743 | B1 | 6/2003 | Hirata et al. |
| 6,614,831 | B2 | 9/2003 | Shver |
| 6,749,661 | B2 | 6/2004 | Shver |
| 6,805,724 | B2 | 10/2004 | Shver |
| 6,870,873 | B2 | 3/2005 | Lyons et al. |
| 6,910,431 | B2 | 6/2005 | Satchell |
| 6,999,495 | B2 | 2/2006 | Popenov et al. |
| 7,491,360 | B2 | 2/2009 | Shver |
| 2004/0174920 | A1* | 9/2004 | Popenov et al. ............ 373/63 |
| 2007/0267787 | A1 | 11/2007 | Higgins et al. |

FOREIGN PATENT DOCUMENTS

| | | |
|---|---|---|
| EP | 1553192 | 7/2005 |

\* cited by examiner

VIEW G

VIEW D

VIEW F

METHODS OF IMPLEMENTING A WATER-COOLING SYSTEM INTO A BURNER PANEL AND RELATED APPARATUSES

RELATED APPLICATION

This application claims priority from U.S. provisional application No. 60/801,176, filed May 17, 2006, and titled "New Burner Panel", the contents of the entirety of which is incorporated by this reference.

BACKGROUND OF THE INVENTION

1. Field of the Invention

Various embodiments of the present invention generally relate to apparatuses and methods for melting, refining and processing metals. More particularly, embodiments of the present invention generally relate to burner panels for use in metal melting furnaces and/or the like.

2. Background

The art of steel making is very well developed. In general, and most commonly, an electric arc furnace (EAF) is used to make steel by application of an electric arc to melt one or more of scrap metal and/or other raw iron products and alloys that are placed within the furnace. Other methods include enhanced versions of EAFs that make steel by melting DRI (direct reduced iron) combined with the hot metal from a blast furnace. To enhance the steel making process, additional chemical energy is provided to the furnace by auxiliary means. The most common forms of auxiliary means comprise burners, injectors, and jets using fuel and an oxidizing gas to produce combustion products with a high heat content to assist the arc.

Further embodiments comprise multiple movable or permanently fixed burners utilizing hydrocarbon fuel such as, for example, natural gas or oil, at least one movable oxygen lance for injection of a stream of oxygen toward the molten bath for refining purposes and a movable means for injecting solid carbonaceous fuel for combustion and slag foaming purposes.

In various embodiments of EAFs, scrap metal, or charges, are dumped into the furnace through an opening. Quite typically these charges further comprise charged carbon and other slag forming materials. Other processes comprise using a ladle for hot or heated metal from a blast furnace and inserting it into the EAF furnace, such as by injection of the DRI by a lance.

There are numerous phases of charge processing in an EAF furnace and/or an EAF-like furnace. In the melting phase, the electric arc and burners melt the burden into a molten pool of metal (melted metal), called an iron carbon melt, which accumulates at the bottom or hearth of the furnace. Most commonly, after melting the charge, an electric arc furnace proceeds to a refining and/or decarburization phase.

In this phase, the metal melt continues to be heated by the arc until slag forming materials combine with impurities in the iron carbon melt and rise to the surface as slag. When the iron carbon melt reaches a boiling temperature, the charged carbon in the melt combines with any oxygen present in the bath to form carbon monoxide bubbles which rise to the surface of the bath, forming foaming slag. The foaming slag acts as an insulator throughout the furnace.

When an electric arc furnace operates without burners, the charged scrap or charge is rapidly melted at the hot spots at regions of highest electric current density, but often remains un-melted at the cold spots. This creates harsh conditions for furnace wall and refractory lining located at the hot spots due to excessive exposure to heat from the arc during the latter portions of the melt down cycle. Scrap located in the cold spots receives heat from the arc at a reduced rate during the melt down cycle, thereby creating cold spots. To melt the cold spots, the heat is applied for a longer period of total time, thereby applying heat to the hot spots for longer than necessary. This asymmetrical heat distribution from the arc and non-uniform wear of the furnace walls are typical for both alternating current and direct current arc furnaces operating without burners.

Cold spots are typically formed in areas further away from the furnace arc as scrap located in these areas receives electrical energy at a reduced rate per ton of scrap. A typical example of such a cold spot is the tapping spout, due to its location away from the arc. Another cold spot occurs at the slag door due to excessive heat losses to ambient air infiltrated through this area. It is common for furnaces utilizing additional injection of materials, such as slag forming material, direct reduced iron, etc., (which is removed through a slag door or through an opening in the furnace side wall) to create cold spots due to localized charging of additional heat consuming materials during the melt down cycle.

Prior art solutions to this challenge have been to incorporate further burners around the furnace to apply additional sources of heat to the cold spots. Electric arc furnaces equipped with burners located at cold spots have improved uniformity of scrap melting and reduce build-ups of materials at the cold spots. When auxiliary heat sources such as burners are placed in the electric arc furnace, their location is chosen to avoid further overheating of hot spots resulting from the rapid melting of scrap located between the electrode and the furnace shell. More specifically, the burners are located as far away from hot spots as is practically possible and the burner flame outlet opening direction is chosen so that flame penetration occurs predominantly into the scrap pile located at the cold spots and not to already heated portions of the furnace.

Further heating and processing is realized by a decarburization process wherein, in typical embodiments of the prior art utilizing advanced or more modern EAF techniques, a high velocity, usually supersonic, flow(s) of oxygen is blown into the metal bath with either lances or burner/lances to decarburize the bath by oxidation of the carbon contained in the bath, forming CO and/or $CO_2$. The burner(s)/lance(s) act more uniformly melt the charge and lessen or prevent overheating and minimize the time required for the melt and time that the arc is operated.

By boiling the metal bath or liquid metal with the injected oxygen, the carbon content of the bath can be reduced to a selected or reduced level. It is commonly regarded that if an iron carbon melt is under 2% carbon, the melt becomes steel. EAF steel making processes typically begin with burdens having less than 1% carbon. The carbon in the steel bath is continually reduced until it reaches the content desired for producing a specific grade of steel, such as, for example, and not by way of limitation, down to less than 0.1% for low carbon steels.

In an effort to decrease steel production times in electric arc furnaces, apparatuses and methods have been developed to alter the means of delivering further energy to the furnace. Various such improvements include, but are not limited to, conventional burners mounted on the water-cooled side walls (panels or furnaces), conventional lances, conventional burners, and/or the like.

Typically, oxygen injection for the decarburization must wait until the melting phase of the process is substantially complete before starting high velocity injection of oxygen.

This is because the burners cannot effectively deliver high velocity oxygen before then because unmelted charge may exist between the burners/lances and the liquid metal or metal melt. The oxygen flow would be deflected, potentially causing severe damage to the furnace.

This fact is aggravated by the generally spherical shape of most EAF furnace structures. Melting of the metal typically occurs in the middle, lower portion of the melt and expands to fill the sides. Early in the melting phase a high velocity oxygen stream has less effect and/or ability to penetrate a not fully melted charge (metal) to decarburize the metal melt.

The same philosophy is used to select the location of other additional auxiliary heat sources including oxygen injection lances for use in decarburization as was used in placing additional burners. When additional lances are located at the cold spot(s), the exothermic energy of melt refining can be used more effectively to melt the scrap without overheating of the hot spots.

Additional injection of oxygen for melt decarburization can be accomplished by any means. Common apparatuses and processes include one or more movable devices, such as submerged, consumable oxygen pipes and/or by one or more water-cooled non-submerged oxygen lances. During operation of a water-cooled lance, the lance is first introduced into the furnace, then gradually moved to the position in which the lance discharge opening or openings for the introduction of oxygen are located, preferably approximately 150-300 mm or more above the bath. The discharge velocity of the oxygen stream from the lance is to be chosen to allow the stream of oxygen introduced by the lance located in the working position to penetrate the slag and to react with the iron-carbon melt without excessive molten metal splashing on the furnace walls and electrode(s). However, inadvertent metal splashing does occur and is a common cause of apparatus failure.

Combined injection of carbon and oxygen via various apparatuses, including dedicated lances in and around the furnace wall has become a common practice for adding extra heat to the process. Typically, the supply of carbon flow for injection is obtained from a carbonaceous material dispenser, such as a compressed gaseous carrier comprising compressed air, natural gas, nitrogen, and/or the like.

The use of the burners together with carbon and oxygen lances has allowed electric steelmakers to substantially reduce electrical energy consumption and to increase furnace production rate due to the additional heat input generated by the oxidation of carbon, and by significant increases in electric arc thermal efficiency achieved by the formation of a foamy slag layer that insulates the ( )electric arc from heat losses. The foamy slag also stabilizes the electric arc and therefore allows for a higher electrical power input rate. The foamy slag layer is created by CO bubbles which are formed by the oxidation of injected carbon to CO. The increased flow of injected carbon creates increased localized CO generation. Accordingly, most EAF furnace units also comprise a post production means for removing or reducing CO levels in the off gas.

Mixing of the CO with oxygen inside of the electric arc furnace is desirable but very difficult to arrange without excessive oxidation of the slag and electrodes. Accordingly, the art field has developed post-production means for treating the high CO content of the off gas.

One of ordinary skill in the art would recognize that the most modern electric arc furnaces are equipped with all or some of the above-mentioned means for auxiliary heat input and or metal melting.

Taken in connection with the improvements to the art field in the design and operation of metal melting furnaces have been improvements in burner panel design. Some such patents teaching and disclosing various burner panel configurations include, but are not limited to U.S. Pat. Nos. 4,703,336; 5,444,733; 6,212,218; 6,372,010; 5,166,950; 5,471,495; 6,289,035; 6,614,831; 5,373,530; 5,802,097; 6,999,495; and, U.S. Pat. No. 6,342,086. Such prior art patents have been beneficial. For example, U.S. Pat. No. 6,999,495 has found wide applicability for increasing spatial energy coverage in a furnace. Likewise, U.S. Pat. No. 6,614,831 has found applicability in extending the reach of various tools, such as a burner or a lance, into the interior of a furnace. However, the art filed is in search of further improved apparatuses and methods for the melting of metals.

It is known that one of the causes of burner panel/lance failure is "flashback", "blowback", "rebound", and/or "jet reflection". These terms commonly refer to a condition resulting from jet (oxygen lance or burner jet) being reflected back to the panel whether the reflection is caused from the steel bath or melting metals (scrap materials inside the furnace that are not yet melted). The use of the term flashback shall mean and refer to all of the aforementioned terms unless specifically stated otherwise. Prior art solutions to various challenges associated with flashback have been dealt with by shielding the burner jet and/or lance. However, shielding often results in increasing the distance from the burner or lance to the steel bath or melting metals. Accordingly, the art field is in search of apparatuses and methods wherein a distance from a burner jet nozzle or lance nozzle to the molten metal is minimized while providing enhanced shielding and/ or protection for a burner jet and/or burner jet nozzle.

Further advantages sought by the art field include a burner panel design comprising a burner, a lance, and or similar apparatus wherein the burner panel has an increased operational efficiency and/or service life.

SUMMARY OF THE INVENTION

Various embodiments of the present invention generally relate to burner panels and related methods for use in a metal melting furnace. In general, novel and non-obvious aspects of embodiments of the present invention relate to enhanced characteristics of an improved burner panel and related methods that result in at least one of increased operational efficiency and/or increased service life. A burner panel apparatus of the present invention generally comprises a water-cooled burner panel and at least one apparatus, wherein the burner panel is at least slightly elongated and extending generally away from a furnace wall and generally towards a metal line, thereby reducing the distance from the burner panel to the molten metal or metal line. Further, a substantial portion of the burner panel extending from the furnace wall is oriented other than orthogonal to at least the molten metal/metal line, wherein exposure of a substantial portion of the burner panel to at least one harsh condition of the furnace is reduced, thereby limiting incidences of burner panel failure. Further, at least one surface of a burner panel of the present invention comprises shaped grooves.

The shaped grooves unexpectedly advantageously channel a flow of a slag. In various embodiments, the channeled slag is capable of forming an at least partially solidified layer about the burner panel. However, in other embodiments, the slag remains liquid or nearly liquid. In embodiments with an at least partially solidified layer of slag on a surface of the burner panel, the slag is capable of at least partially insulating the burner panel, thereby at least one of protecting the burner panel from damage and/or increasing the service life of the burner panel. Likewise, liquid slag provides some measure of insulation.

In various embodiments, apparatuses associated with burner panel apparatuses of the present invention generally comprise at least one of burners, lances, supersonic lances, particulate injectors, post combustion apparatus, and/or the like.

Accordingly, improved features and/or enhanced characteristics of various burner panel apparatuses of the present invention comprise at least one of decreased distance to the molten metal/metal line; extension over pipes along a refractory portion of the furnace; extension over furnace brick; extension over shell structures; extension over other items commonly in a furnace; energy savings; improved burner efficiency; reduction in the oxidizing gas flow pattern of associated apparatuses degradation of hearth material and/or other furnace equipment mounted nearby; in various embodiments with a carbon injector, an enhanced carbon flow pattern from the injector sufficient to penetrate at least a portion of the slag within the furnace to produce foaming; improved burner efficiency (both in terms of at least meting and/or cutting scrap and decarburizing and refining the steel; enhanced carbon flow pattern sufficient to inject through the slag and into the steel bath within the furnace to produce foaming slag; and a general reduction in burner panel failure.

Because the burner panel apparatus of the present invention extends out from the furnace wall, the at least one associated apparatus apertures is closer to the surface of the metal melt/metal line. Likewise, the at least one associated apparatus apertures is closer to the center of the furnace thereby providing at least increased efficiency.

A greater understanding of the present invention may be had from reference to the following detailed description and the appended claims.

BRIEF DESCRIPTION OF THE FIGURES

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE INVENTION

Figure 1:
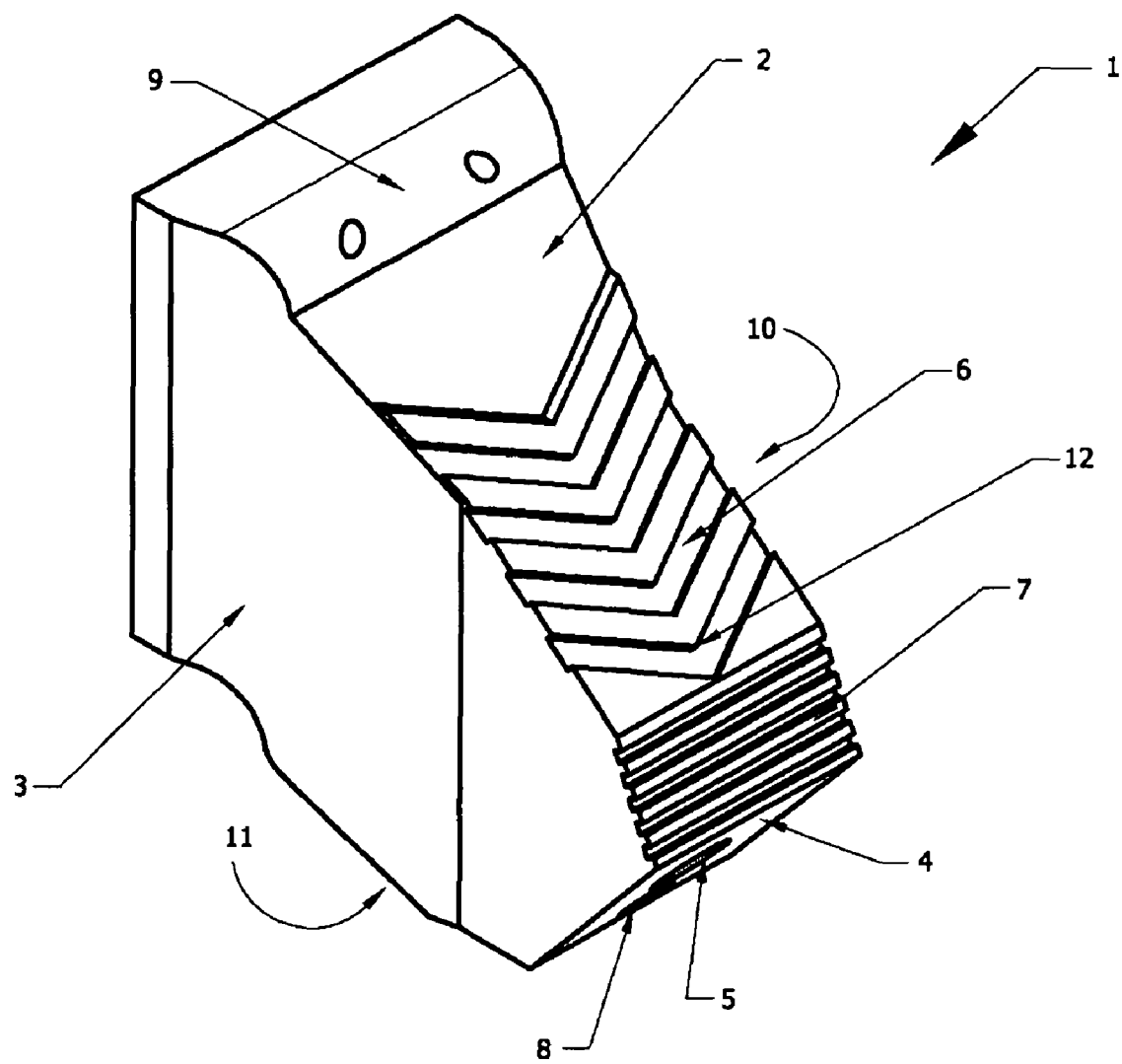
FIG. 1 is an illustration of a perspective view of an embodiment of a burner panel of the present invention.

The following definitions and explanations are meant and intended to be controlling in any future construction unless clearly and unambiguously modified in the following Examples or when application of the meaning renders any construction meaningless or essentially meaningless. In cases where the construction of the term would render it meaningless or essentially meaningless, the definition should be taken from Webster's Dictionary, $3^{rd}$ Edition.

As used herein the term, "air" means and refers to a gaseous mixture that comprises at least about 20 mole percent $O_2$.

As used herein, the term "attached," or any conjugation thereof describes and refers to the at least partial attachment of a tubesheet bundle and a vessel and/or core.

As used herein, the term "burden" means and refers to raw material loaded into a furnace.

As used herein, the term "burner" means and refers to all burners, lances, supersonic lances, and/or the like. In general, to burn something is for it to combust "a chemical reaction" facilitated and/or created by the addition of oxygen. Accordingly, a burner is any apparatus that adds oxygen.

As used herein, the term "charge" means and refers to a batch of raw material loaded into a furnace.

For illustration purposes only, and not by way of limitation, two or more charges are referred to as a "heat". Typically, a "heat" is the end result/product of two or more charges. The "heat" is commonly tapped or loaded through the tap hole, most commonly located about EBT (Eccentric Bottom Tap). Tap-to-Tap times are important benchmarks in the industry, as they relate to production rate. Likewise important is "Power On" time for a particular combustion unit, the amount of time the electrodes are energized. Other considerations include percent yield that refers to iron loss during operation.

As used herein, the term "chemical reaction" means and refers to any interaction between two or more chemicals resulting in a chemical change in the original reactants. The reactions may be oxidative or reductive in nature. The reaction can occur in any state, including the solid, gaseous, or liquid state or an interface thereof. The reaction can be enhanced (e.g., efficiency improved, reaction rate increased) by addition of one or more catalysts.

Exemplary, non-limiting embodiments of furnaces capable of use with varying embodiments of the present invention include, but are not limited to U.S. Pat. Nos. 6,805,724; 6,749,661; 6,614,831; 6,440,747; 6,342,086; 6,289,035; 6,212,218; 5,802,097; 5,554,022; 6,910,431; 5,599,375; 4,622,007; and, Re. 33,464, the contents of which are hereby incorporated by reference as if they were presented herein in their entirety. In general, any furnace may be used with the various embodiments of the present invention.

As used herein, the term "field application" means and refers to experiments performed on samples, including samples taken from the environment, unless stated otherwise in the description.

As used herein, a "fluid" means and refers to a continuous, amorphous substance whose molecules move freely past one another and that has the tendency to assume the shape of its container, for example, but not limited to, a liquid or a gas.

As used herein, the term "foamy slag" means and refers to a practice where the slag entrains gas bubbles, usually, but not limited to, CO gas bubbles, and expands or is allowed or encouraged to expand in volume to at least partially cover the electrode(s) of the furnace and protect furnace components from the arc radiation that is very desirable in many steel making processes. Particulates, such as CaO and MgO, are often introduced to form slag and correct its chemistry to provide a good basis for slag foaming. Slag foaming is generally accomplished by the introduction of particulate carbon into the bath where it reduces FeO to Fe in an endothermic reaction producing CO bubbles which expand the volume of the slag and cause it to foam ("foamy slag"). The foamed slag, among other uses, acts as a blanket to at least partially hold in heat for the process and/or to shield furnace components from the radiation of the electric arc.

As used herein, the term "orthogonal" means and refers to an orientation of or relating to right angles.

As used herein, the term "slag" means and refers to the glass-like mass left as a residue by the smelting of metallic ore. The production of a correct slag composition for the iron carbon melt during the refining phase is important in achieving desired steel chemistry and in cleaning the steel of impurities. In a furnace, slag exists both in a liquid state and a solid/semi-solid state.

As used herein, the term "tuyere" means and refers to a nozzle through which an air blast is delivered to a forge, blast furnace, blast oxygen furnace, and/or the like.

Other than in the operating examples, or where otherwise indicated, all numbers expressing quantities of ingredients or reaction conditions used herein are to be understood as modified in all instances by the term "about".

Various embodiments of the present invention have wide applicability across the art field for providing enhanced and/or improved burners for a furnace and related methods of use. This disclosure will discuss application of the improvements of the present invention as it relates to furnaces in primarily the field of steel making. However, one of ordinary skill in the art would be able to readily apply the technology across all furnace technologies and the particular embodiments herein described should not be read as limiting on the full scope of this patent specification and the appended claims.

In general, novel and non-obvious aspects of embodiments of the present invention relate to at least one enhanced characteristic of an improved burner panel/mounting enclosure and related methods that result in at least one of increased operational efficiency and/or increased service life. The term "burner panel", in terms of the various embodiments of this invention should be understood and construed as generally any sidewall mounted panel, and not limited to any burner panel described herein. Further, many other enhanced characteristics of various embodiments of a burner panel will become apparent throughout this specification.

In various embodiments, the burner panel is fluid cooled, such as water-cooled, to survive the hostile environment of the electric arc furnace and is designed to occupy the step between the sidewall and hearth of the furnace without any substantial change to the structure of the furnace. The mounting enclosure comprises a plurality of fluid cooling conduits surrounding an apparatus aperture and an injector aperture that are formed through the enclosure and adapted to mount an apparatus and an injector. The mounting arrangement includes utilizing a burner panel to mount an apparatus with supersonic oxidizing gas lancing capability and an injector for particulate carbon in an electric arc furnace.

Further improved features and/or enhanced characteristics of various burner panel apparatuses of the present invention comprise at least one of decreased distance to the molten metal/metal line, extension over pipes along a refractory portion of the furnace, extension over furnace brick, extension over shell structures, extension over other items commonly in a furnace, energy savings, improved burner efficiency, ability to be used as a plug and use apparatus, and a reduction in burner panel failure.

Now referring to FIG. 1, an illustration of a three dimensional perspective view of an embodiment of a burner panel apparatus of the present invention. Burner Panel 1 generally comprises tapered upper surface 2, tapered sidewall surface 3, tapered sidewall surface 10, tapered underside surface 11, at least one shaped groove 6, front side surface 4, and aperture 5. Further embodiments comprise a straight groove portion 7, second aperture 8, post combustion aperture portion 9, an extending element (not shown), and/or the like, as is illustrated in FIG. 1. Shaped groove 6 is a V-shaped groove in this Figure.

Generally, in the embodiment of FIG. 1, tapered upper surface 2, tapered sidewall surface 3, tapered sidewall surface 10, and tapered underside surface 11 appropriately intersect at a first length from the furnace wall to form a quadrangular tapered structure. The taper extending from a furnace wall along at least a portion of the length of the burner panel towards the melting metal of the furnace (illustrated in FIG. 6). However, the tapered structure may generally be any structure capable of containing at least one apparatus, such as, but not limited to spherical, triangular, pentangular, hexangular, and/or the like structure. Further embodiments contemplate a structure that is not tapered and constructed with generally straight portions.

The structure of burner panel 1 has several advantages over wall mounted and/or wall-supported burner panels. A primary advantage is the decreased distance to the metal line from a burner panel of the present invention. In an embodiment, a burner panel of the present invention is capable of reaching at least to the split line (where the upper and lower furnace shells meet). In various embodiments, the burner panel of the present invention extends beyond, over, and/or lower than the split line. In an embodiment, the decrease in distance to the metal line is at least about 10%. In an alternate embodiment, the decrease in distance to the metal line is at least about 15%. In an alternate embodiment, the decrease in distance to the metal line is at least about 20%. In an alternate embodiment, the decrease in distance to the metal line is at least about 25%. In an alternate embodiment, the decrease in distance to the metal line is at least about 30%. In an alternate embodiment, the decrease in distance to the metal line is at least about 33%. In an alternate embodiment, the decrease in distance to the metal line is at least about 40%. In an alternate embodiment, the decrease in distance to the metal line is at least about 50%. The decrease in distance from the burner panel to the metal line can be modified by several factors, such as the length of the tapered burner panel, the use of a gap panel (as described in reference to FIG. 4), the height of the burner panel above the refractory portion, and/or the like.

In various embodiments, a burner panel of the present invention is capable of reaching beyond a sill line of the furnace, wherein the sill line is an edge of the refractory portion of the furnace, quite commonly the refractory bricks. In an embodiment, the decrease in distance to the metal line is at least about 10%. In an alternate embodiment, the decrease in distance to the metal line is at least about 15%. In an alternate embodiment, the decrease in distance to the metal line is at least about 20%. In an alternate embodiment, the decrease in distance to the metal line is at least about 25%. In an alternate embodiment, the decrease in distance to the metal line is at least about 30%. In an alternate embodiment, the decrease in distance to the metal line is at least about 33%. In an alternate embodiment, the decrease in distance to the metal line is at least about 40%. In an alternate embodiment, the decrease in distance to the metal line is at least about 50%. The decrease in distance from the burner panel to the metal line can be modified by several factors, such as the length of the tapered burner panel, the use of a gap panel (as described in reference to FIG. 4), the height of the burner panel above the refractory portion, and/or the like.

In the embodiment illustrated in FIG. 1, at least one shaped groove 6 is oriented along upper surface 2. In the embodiment illustrated, shaped groove 6 is a V-shaped groove 6. The apex 12 of at least one V-shaped groove 6 generally points along or follows the taper of upper surface 2. V-shaped groove 6 acts to channel foaming slag and/or slag along upper surface 2 of burner panel 1. The V-shaped grooves unexpectedly channel a flow of a slag wherein the slag is capable of forming an at least partially solidified layer about the burner panel. The at least partially solidified layer of slag on the panel is capable of at least partially insulating the burner panel, thereby at least one of protecting the burner panel from damage and/or increasing the service life of the burner panel.

Shaped groove 6 is illustrative of a general structure of a groove to be used on various embodiments of the present invention. In an embodiment, shaped groove 6 is U-shaped. In an alternate embodiment, shaped groove 6 is arcuate. In general, V-shaped groove 6 can be any arcuate structure.

Slag inside the furnace exists in at least two states, liquid and solid. As the foaming slag and/or slag boils, pops, expands, and/or the like, at least a portion of it will contact a surface of burner panel 1. As a liquid, the slag will still offer protection. However, in the solid state, the slag offers far more protection, in general.

When the slag is in a solid state, the V-shaped grooves act as a footing for the slag, offering resistance to assist in preventing the slag from sliding or moving off burner panel 1. When the slag is in the liquid state, the V-shaped grooves will act to keep the slag on burner panel 1 longer by directing the slag along the length of upper surface 2 of panel burner panel 1. Keeping the slag on burner panel 1 longer will allow a cooling system (not shown in FIG. 1) to act through burner panel 1 on the slag, wherein the cooling system will cool the slag. Cooling the slag will enhance the formation of solid state slag or semi-solid state slag wherein the operational efficiency and/or service life of burner panel 1 will be enhanced.

In various embodiments, incorporation of V-shaped grooves increases operational efficiency by at least about 5%. In an alternate embodiment, incorporation of V-shaped grooves increases operational efficiency by at least about 10%. In an alternate embodiment, incorporation of V-shaped grooves increases operational efficiency by at least about 15%. In an alternate embodiment, incorporation of V-shaped grooves increases operational efficiency by at least about 20%. In an alternate embodiment, incorporation of V-shaped grooves increases operational efficiency by at least about 30%. In an alternate embodiment, incorporation of V-shaped grooves increases operational efficiency by at least about 40%.

In various embodiments, incorporation of V-shaped grooves increases service life by at least about 5%. In an alternate embodiment, incorporation of V-shaped grooves increases service life by at least about 10%. In an alternate embodiment, incorporation of V-shaped grooves increases service life by at least about 15%. In an alternate embodiment, incorporation of V-shaped grooves increases service life by at least about 20%. In an alternate embodiment, incorporation of V-shaped grooves increases service life by at least about 30%. In an alternate embodiment, incorporation of V-shaped grooves increases service life by at least about 40%.

The V-shaped grooves have an unexpected result of further aiding in the shielding process or effect of a foaming slag or a slag coating.

Front side surface 4 is the only portion of the extending portion of burner panel 1 that is orthogonal to potential splashing metal from melting metal in the furnace, thereby limiting the incidence of direct hits. Further reduction in hits is accomplished by limiting the size of front side surface 4.

In an embodiment, front side surface 4 is slightly larger than at least one aperture 5. In an alternate embodiment, a second aperture 8 is on front side surface 4. In yet a further embodiment, further apertures are added. In general, any number of apertures can be included on front side surface 4. Generally, an aperture exists for each apparatus extending through and/or associated with burner panel 1. Aperture 5, second aperture 8, and/or any other aperture can be any desired size. Typically, the size of an aperture is related to the size of the associated apparatus. In applications wherein concern exists for a burner panel failure, the size of an aperture and the size of a front panel is limited, to reduce the orthogonal area.

The shape of an aperture of the present invention can vary. In general, apertures are circular. However, apertures may be of any shape, such as, but not limited to spherical, triangular, pentangular, hexangular, and/or the like structure. Generally, an aperture shape is associated with the shape of the associated apparatus.

Various embodiments of a burner panel of the present invention further comprise a straight groove portion 7. Straight groove portion 7 is adapted to further assist in the accumulation of foaming slag and/or slag. Straight groove portion 7 is an optional element.

In various embodiments, a post combustion portion 9 is associated or affixed to burner panel 1. Post combustion portion 9 is used to add further oxygen to the furnace.

In an embodiment, burner panel 1 is constructed to fit within a pre-existing slot for a burner panel. In other embodiments, burner panel 1 is adapted to utilize furnace panel attachment means, such as bolts, clamps, screws, nails, glue, and/or the like. It is anticipated that a bracket portion may have some areas orthogonal to potential splashing metal from the melting metal. However, such orthogonal areas should be limited, as they increase risk of burner panel failure.

Figure 2:
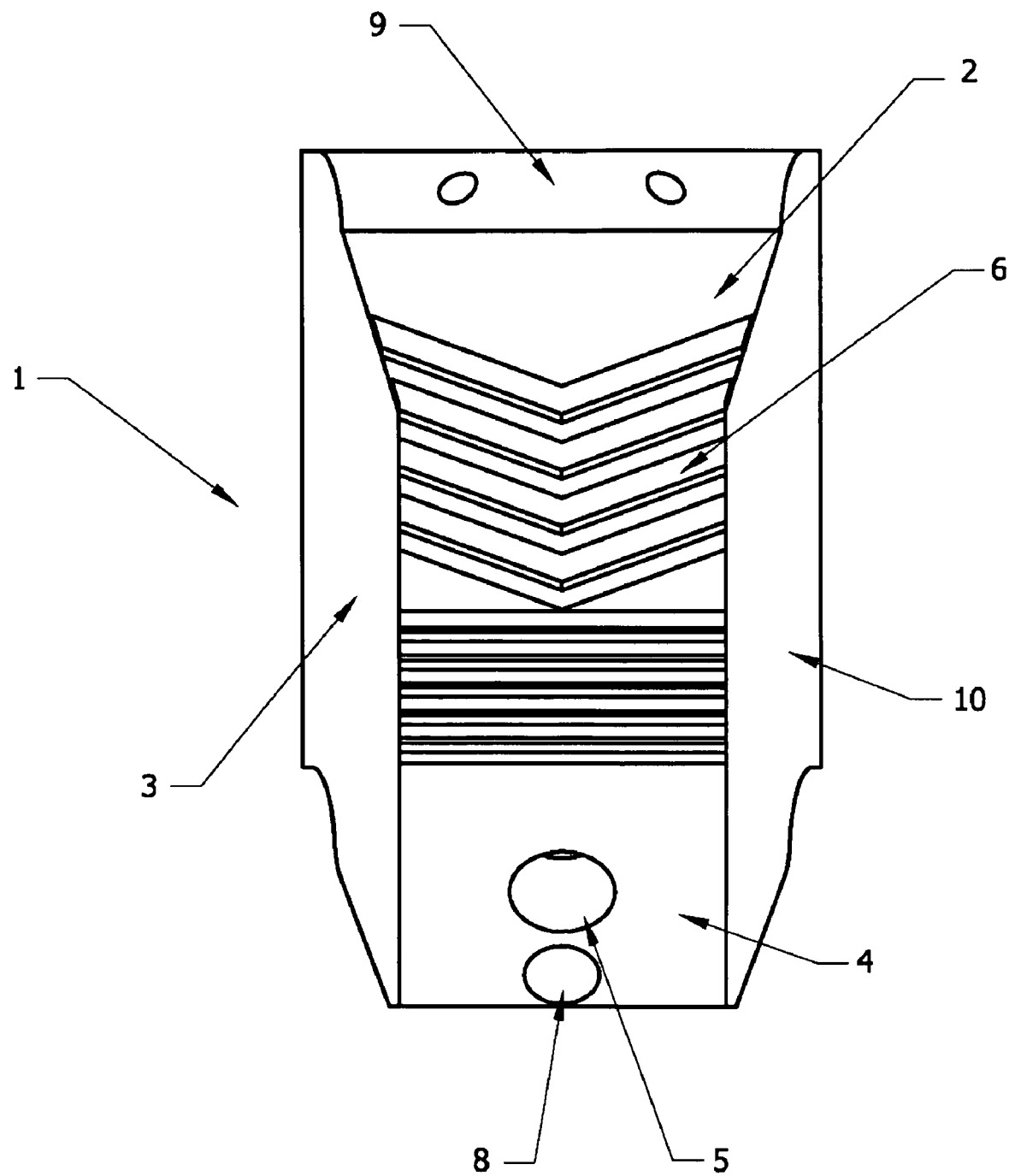
FIG. 2 is an illustration of a front perspective view of the embodiment of FIG. 1.

Now referring to FIG. 2, a front perspective view of the apparatus of FIG. 1 is illustrated. The general taper of an embodiment is illustrated. As is made more apparent, front side surface 4 is substantially the only surface orthogonal to potential splashing metal from the melting metal.

Figure 3:
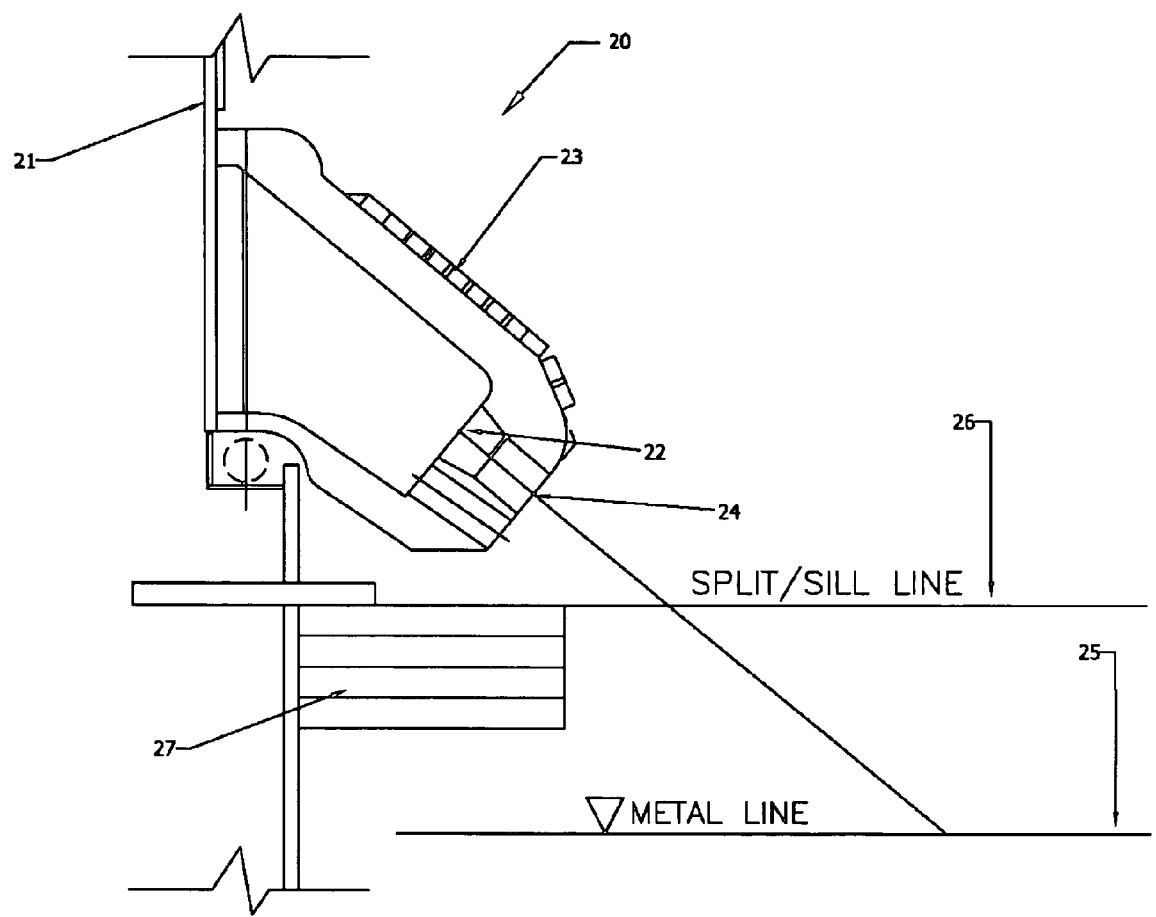
FIG. 3 is an alternate embodiment of a cross-section of a burner panel of the present invention wherein the burner panel is attached to a furnace wall.

Now referring to FIG. 3, a side perspective view of an embodiment of a burner panel 20, aperture 24, and at least one V-shaped groove 23 of the present invention attached to a furnace wall is illustrated. Burner panel 20 is attached to furnace wall 21. Burner panel 20 is typically placed and/or oriented along a lower portion (within, in an embodiment, a lower panel space) of furnace wall 21 above refractory portion or brick 27. Aperture 24 of burner panel 20 extends over and beyond refractory portion 27, thus minimizing or limiting a distance from aperture 24 to metal line 25, the melting metal.

Burner panel 20 illustrates a cavity 22 for an apparatus. Cavity 22 generally extends throughout the body of burner panel 20 to about aperture 24 and across furnace wall 21.

Figure 5:
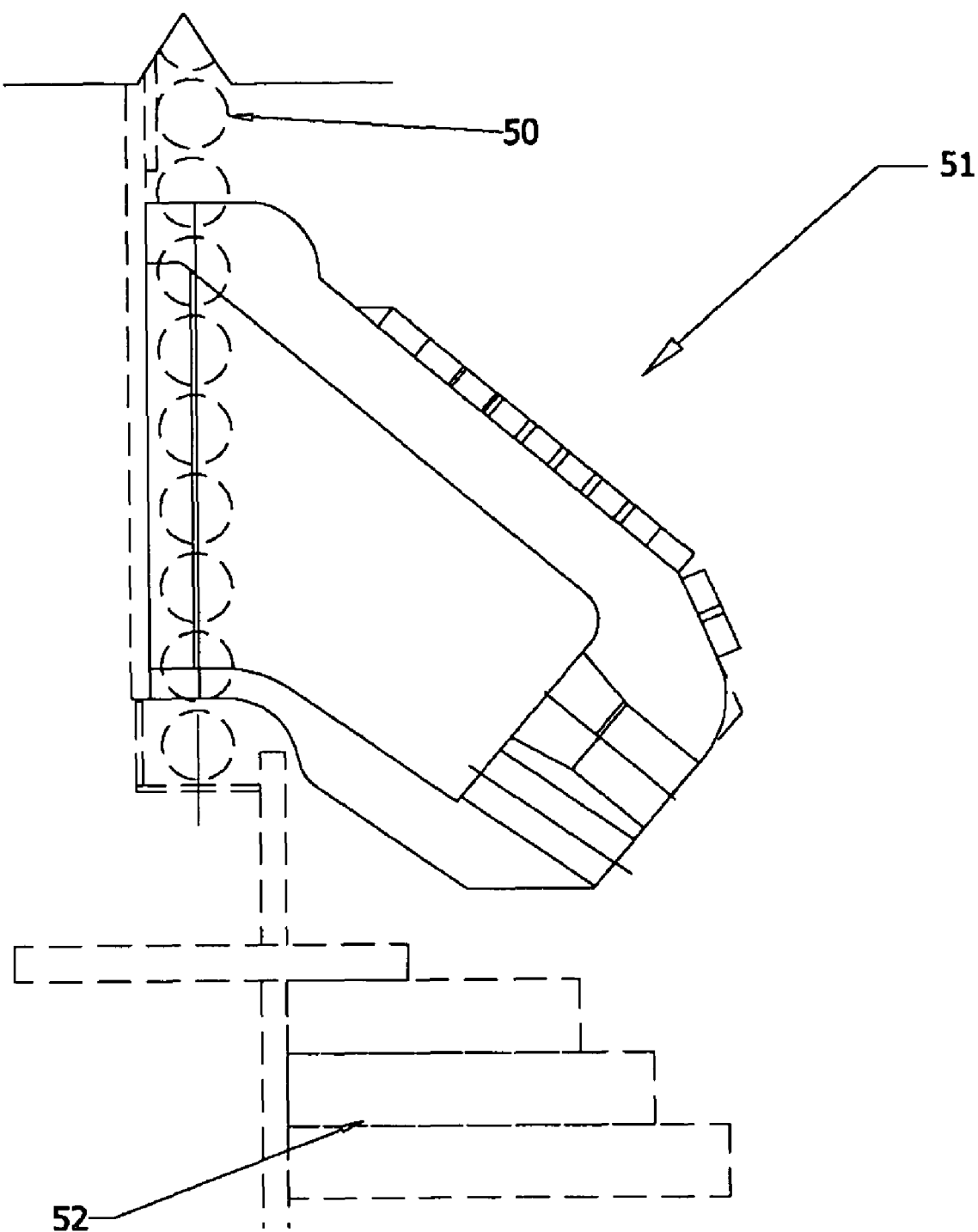
FIG. 5 is an illustration of a cross-section of an alternate embodiment of a burner panel installed on a furnace wall.

Not shown in great detail in this Figure, but readily understood by one of ordinary skill in the art, is a water cooling system positioned within furnace wall 21 to assist in removing heat from the surface of furnace wall 21 and/or burner panel 20. In various embodiments, burner panel 20 has an independent water-cooling system. Removing heat from furnace wall 21 and/or burner panel 20 can reduce incidence of failure by cooling the apparatus and the furnace. Generally, as the flow of water is increased through water-cooling element 50 (as shown in FIG. 5) the temperature of burner panel 20 and/or furnace wall 21 is reduced or maintained. Maintaining or reducing the temperature of burner panel 20 and/or furnace wall 21 can allow for higher operating efficiency by increasing the operational temperature of the furnace, thereby melting the metal faster.

In the embodiment illustrated in FIG. 3, burner panel 20 does not extend below split line. However, in various other embodiments, burner panel 20 does extend below split line 26, thereby decreasing the distance between an aperture of a burner panel of the present invention and a metal line.

Figure 4:
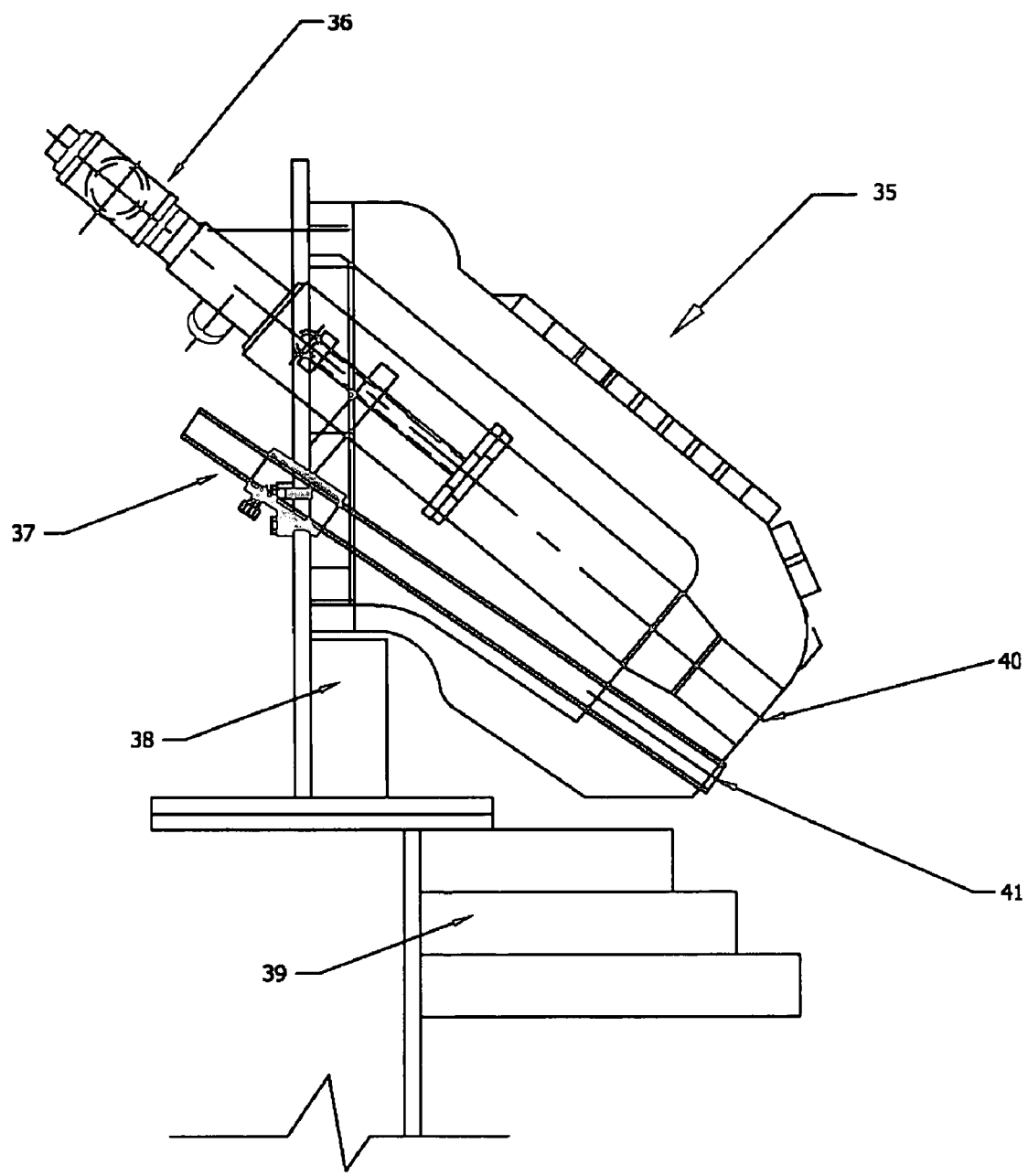
FIG. 4 is an illustration of an alternate embodiment of a cross-section of a burner panel with a gap panel inserted below the burner panel illustrating an angle of incidence for a burner injector and a carbon injector.

Now referring to FIG. 4, a burner panel 35 is illustrated with an oxygen injector apparatus 36, a carbon injector apparatus 37, refractory portion 39, aperture 40, and aperture 41. Aperture 40 and aperture 41 are aligned such that the discharge from oxygen burner apparatus 36 and a carbon injector apparatus 37 intersect at about the metal line. Maximum effect from the carbon injection and the oxygen burner is experienced when the two streams are introduced to the metal line at or about the point of mixture. However, various other embodiments mix the two streams before introduction to the melting metal. In general, a flow rate of an apparatus causes both a region of negative pressure and eddy currents in the proximity. The flows in the vicinity are based in part on Bernoulli's' equation. In an embodiment, the object is to get the carbon injection close enough to be "sucked" into the stream path and not to be deflected and more inefficiently dispersed by the circulating eddy currents, as would be expected to happen if the apertures were separated at to great a distance.

The number of apparatuses associated with a burner panel apparatuses can vary from 1 to 10. In an embodiment, there is a dedicated aperture for each apparatus. In an alternate embodiment, one or more apparatuses share an aperture.

In an embodiment of an associated apparatus of the present invention, the apparatuses are positioned side by side in a burner panel at about a nozzle at the entrance of a flame-shaping chamber of a fluid cooled combustion chamber. Various embodiments further comprise a plurality of fuel orifices for providing pressurized fuel to the combustion chamber and/or a plurality of oxidizing gas orifices for providing a secondary flow of an oxidizing gas around the periphery of the nozzle. In an embodiment, all of the flows of fuel, oxidizing gas and particulates pass through the flame-shaping chamber, and are all substantially directed to the same location in the electric arc furnace. The directionality of the various flows allows the apparatuses to heat a localized spot of the slag/charge with thermal energy from the oxidation of the fuel, from the oxidation of oxidizable components in the slag or the melt by the lancing of supersonic oxidizing gas, and/or from any combination of these.

In an embodiment, once a spot in the slag is sufficiently heated, a flow of carbon is directed to the localized hot spot in the slag to reduce the FeO, and other oxides, in the slag to carbon monoxide and produce foamy slag. The particulate carbon introduction can be accompanied by further oxidizing gas injection before, during, and/or after the carbon injection.

Furnaces constructed typically have a somewhat uniform structure. A benefit of the various designs of embodiments of the present invention are that they can be adapted to fit within pre-machined and/or cut areas, such as a panel gap or to replace a panel. In an embodiment, burner panel 35 is designed smaller than the available space within the furnace wall and a gap panel 38 is used to make up the difference. An advantage to using a gap panel 38 is that the installation of burner panel 35 can be adjusted. For example, and not by way of limitation, to alter or change the angle of incidence from an apparatus to the metal line, gap panel 38 can be removed and reinstalled above burner panel 35, thereby lowering burner panel 35 and decreasing the distance from aperture 40 and/or aperture 41 to a metal line.

Gap panel 38 can also be used to raise burner panel 35. Raising burner panel 35 can be desirable in situations where burner panel 35 is wearing rapidly or if the melting rate within the furnace is to be lowered.

Now referring to FIG. 5, a side perspective of a burner panel 51 with water-cooled furnace elements 50, the furnace wall above refractory portion 52 is water-cooled. Water-cooling is accomplished typically by piping or conveying water along or near a surface of the furnace. The conveyed water removes heat from the furnace, thereby cooling the furnace. Water is kept flowing through water-cooled elements 50. In an embodiment, the greater the flow of water, the greater the amount of heat removed from the furnace. Typically, all furnace walls have a cooling system, such as water cooling. Cooling is not generally necessary along the refractory portion, as the refractory portion is typically capable of handling and/or withstanding the heat. However, various embodiments comprise a cooling system that at least partially cools a portion of the refractory portion, thereby reducing stress on the refractory portion and/or increasing service life.

In various embodiments, burner panel 51 is a plug and use system, such that at least a portion of a furnace panel is removed and an embodiment of a burner panel of the present invention is inserted in the space occupied previously by at least a portion of the furnace panel. In an embodiment, a cooling system associated with the burner panel is regulated prior to use. In an alternate embodiment, a stand-alone cooling system is used with a plug and use burner panel of the present invention.

Further embodiments of the present invention comprise further or different cooling systems such as gas and/or the like.

Figure 6:
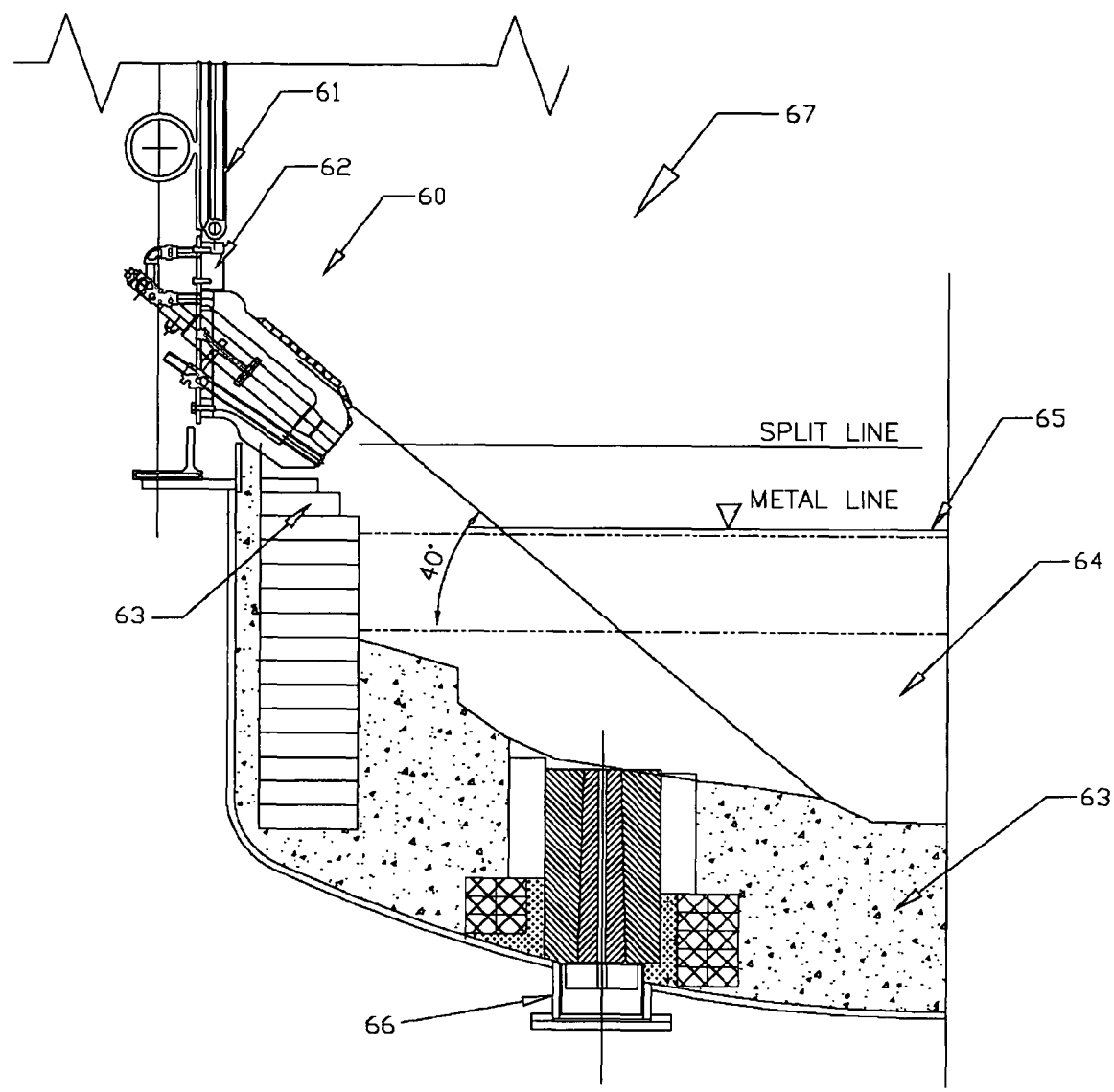
FIG. 6 is an illustration of a cross-section of a furnace illustrating a cross section of an embodiment of a burner panel of the present invention

Now referring to FIG. 6, an embodiment of a burner panel 60 is illustrated in a furnace 67. Burner panel 60 is installed in furnace wall 61, below gap panel 62, and above refractory portion 63. Refractory portion 63 generally includes at least a refractory brick portion. Furnace 67 comprises furnace wall 61, melting metal 64, a melting metal line 65, refractory portion 63 and door 66. Generally, at least one burner panel 60 applies energy to melting metal 64. In various embodiments, multiple burner panels 60 are installed. In fact, a burner panel 60 can be installed proportionately about furnace 67 such that no cold spots remain or that such cold spots are minimized. As can be seen, areas orthogonal of burner panel 60 to metal melt line 65 are limited. Door 66 can be a variety of structures, including, but not limited to a bottom tap, an Argon stir port, and/or the like.

Figure 7:
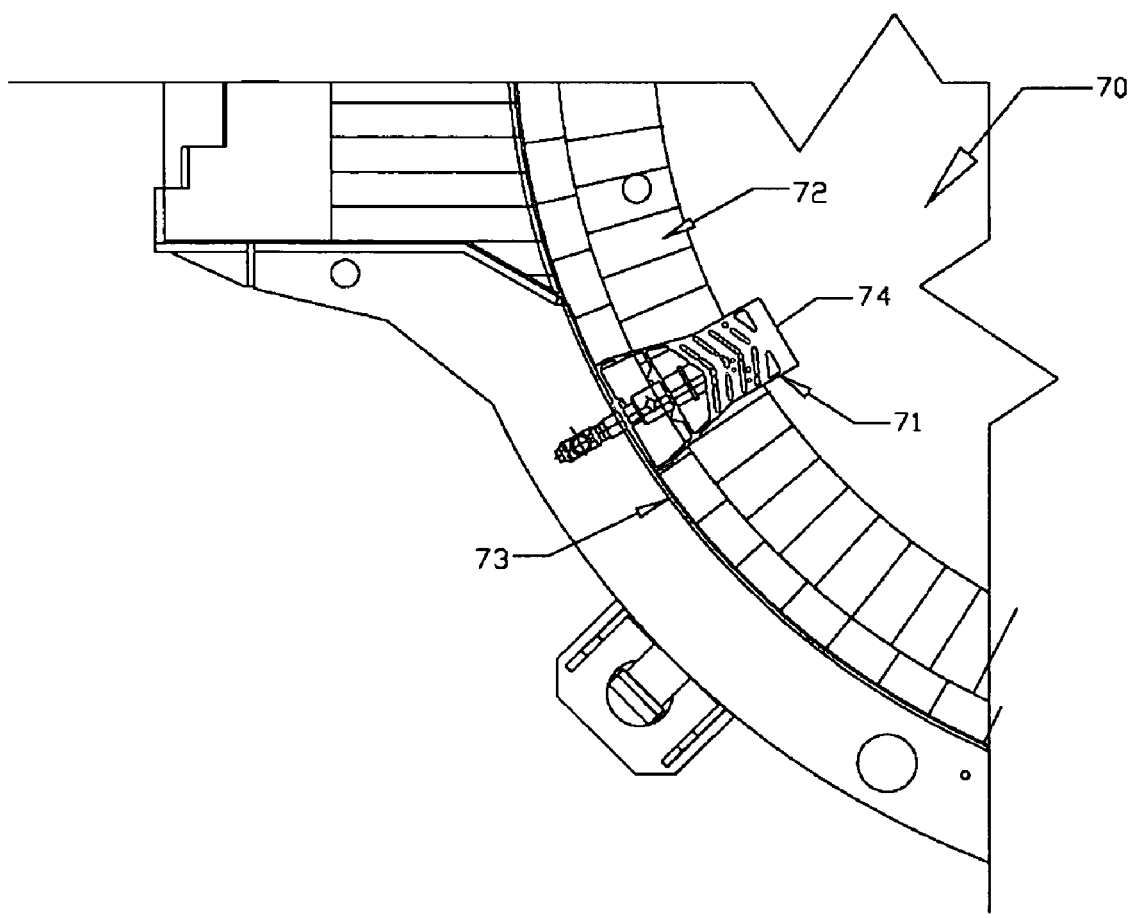
FIG. 7 is an illustration of a top view of an alternate embodiment of a burner panel installed on a furnace wall.

Now referring to FIG. 7, a top perspective of furnace 70 is illustrated. A burner panel 71 extends across furnace wall 73 towards a melting metal (not illustrated) above refractory portion 72. V-shaped portion 74 is oriented towards the interior of furnace 70. In various embodiments, multiple burner panels are installed.

Figure 8:
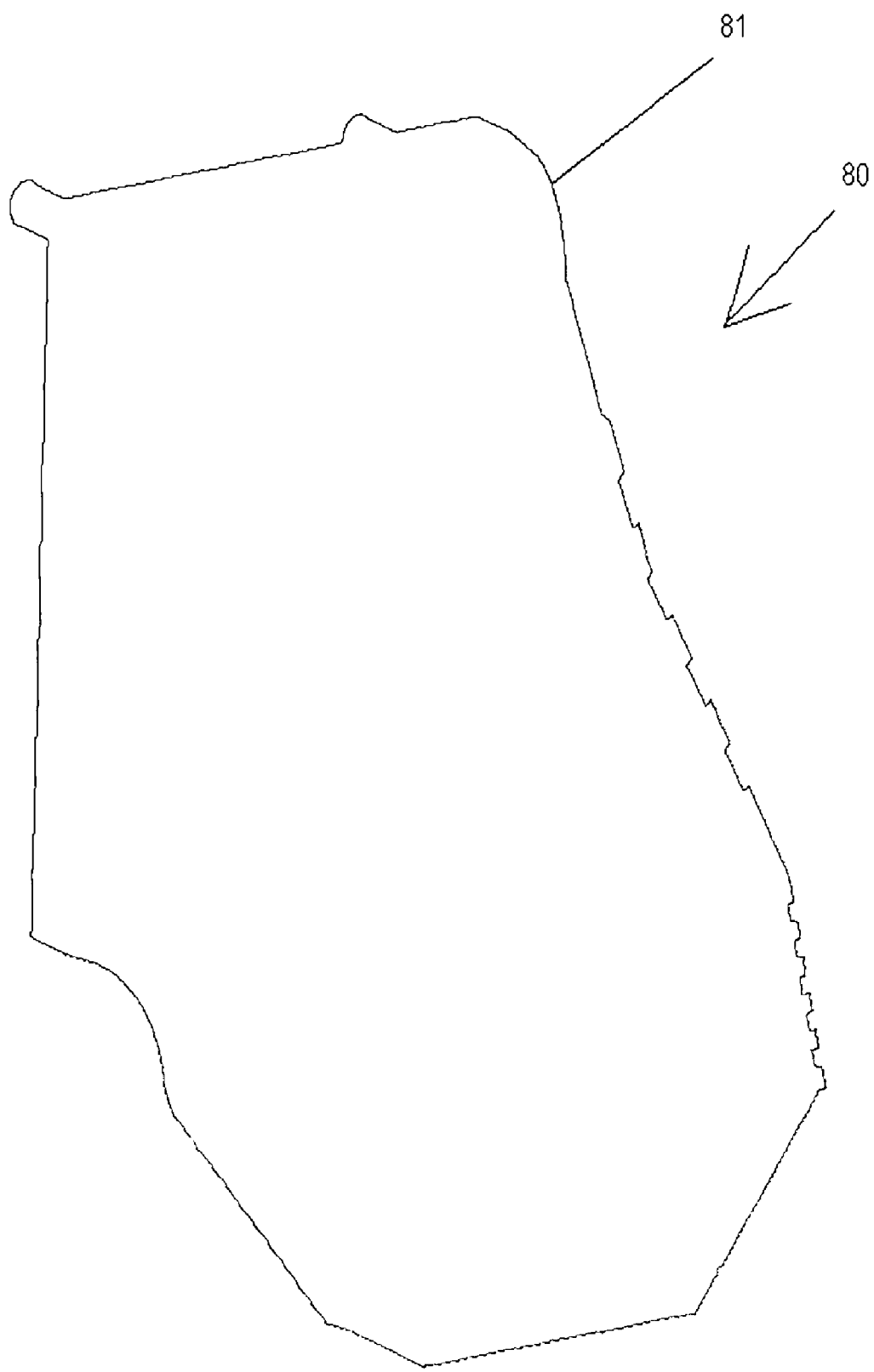
FIG. 8 is an illustration of an alternate embodiment of a burner panel of the present invention illustrating an embodiment of post combustion apertures.

Now referring to FIG. 8, a perspective view of a burner panel 80 is illustrated. Post combustion ports 81 are illustrated along an upper portion of burner panel 80. Generally, an embodiment of a water-cooled system can be inserted into burner panel 80. The incorporation of a water-cooled system overcomes many problems experienced in the art field by cooling burner panel 80. A common challenge experienced with prior art systems are that the flow of water through a water cooling system has been inadequate to properly cool the burner panel. Accordingly, various embodiments of the present invention incorporate enhanced or increased diameter pipes over typical pipes incorporated in cast water-cooled panels of prior art. For example, the prior art typically uses a 1.0-inch diameter pipe for the water-cooling system. Further, other prior art embodiments use uses a Nom 1" schedule 80 pipe. However, various embodiments of a water-cooled system of the present invention incorporate a pipe 25% larger, a 1.25 inch pipe, thereby increasing the volume of water flow across or through burner panel 80 by at least 25%. At least one embodiment of the present invention incorporates a pipe with an inner diameter (effective diameter) that is 33.5% larger than typical prior art designs, a Nom 1¼" schedule 80 pipe, thereby increasing the volume of water flow across or through the burner panel 80 by at least 75%.

Increasing the flow of water removes more heat and results in increased operational efficiency and/or increased service life.

Figure 9:
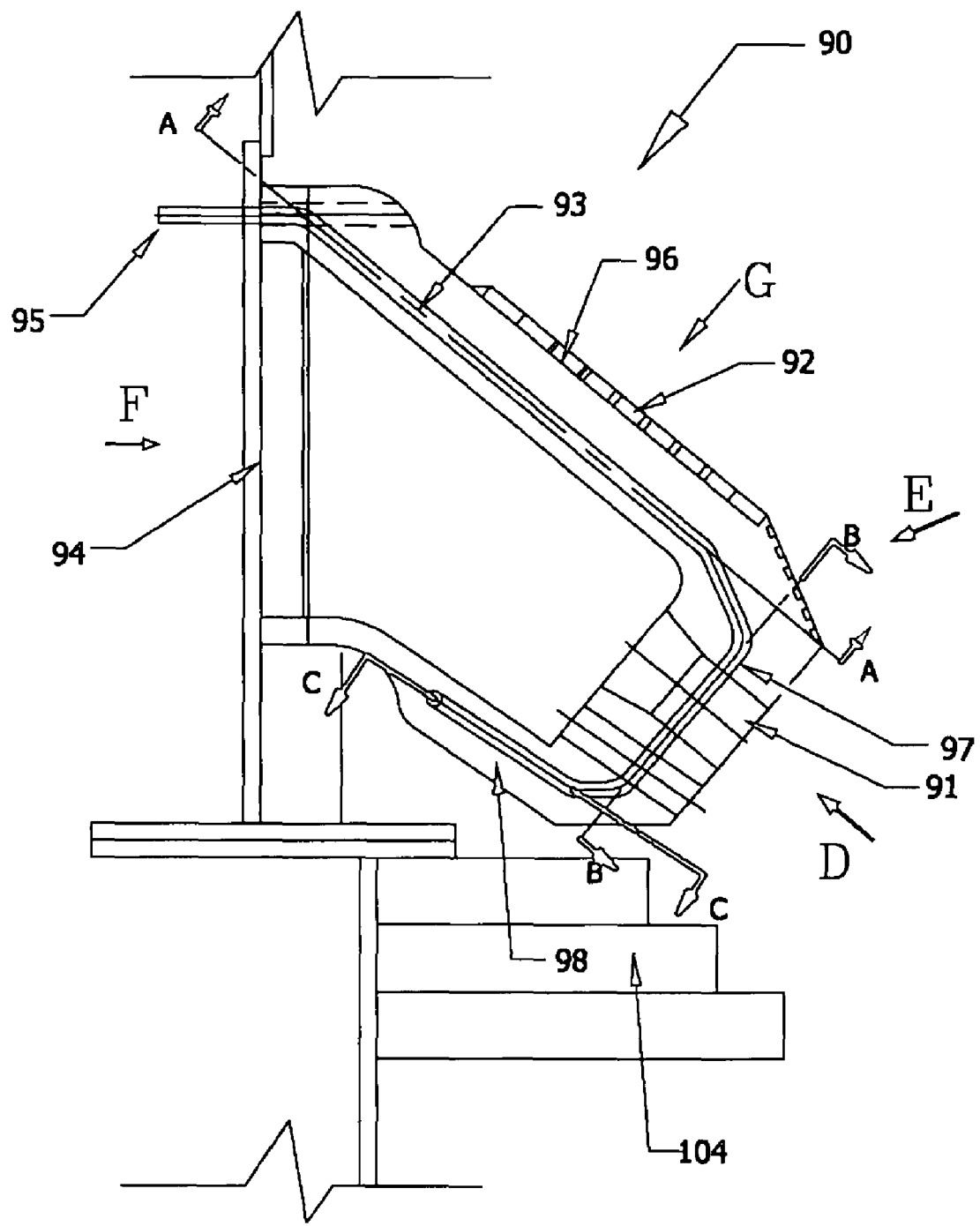
FIG. 9 is an illustration of a cross-section of an alternate embodiment of a burner panel of the present invention.

Now referring to FIG. 9, a side perspective cross section of a burner panel 90 is illustrated. Burner panel 90 generally comprises aperture 91, Shaped grooves 92, water cooling system 93, water cooling system connection 95, furnace wall 94, and a refractory portion 98. As is illustrated, water-cooling/water-cooled system 93 generally extends about/just beneath a surface of burner panel 90. In the embodiment illustrated, water-cooling system extends beneath upper surface 96, underside surface 104, at least a portion of front side surface 97, and at least one of the side surfaces (not shown). In an embodiment, cooling system 93 is connected through cooling system connection 95 and can be adapted as a plug and use system to attach directly to the cooling system within or associated with furnace wall 94. Pipes associated with cooling system 93 can be constructed of any material common in the art. Typically, a highly heat conductive material is chosen. Suitable materials include, but are not limited to copper, brass, steel, iron, alloys of the same, and/or the like. Primary design considerations for an embodiment of a cooling system of the present invention comprise operating temperature, desired amount of heat to be removed from an associated burner panel, pressure of liquid within the associated pipe, flow speed of a liquid within the pipe, and/or the like. In various embodiments, generally, a water-cooling system is used along wherever the burner panel will be exposed to excessive heat. Also evident is the manner in which burner panel 90 extends over and/or beyond refractory portion 98.

Figure 10:
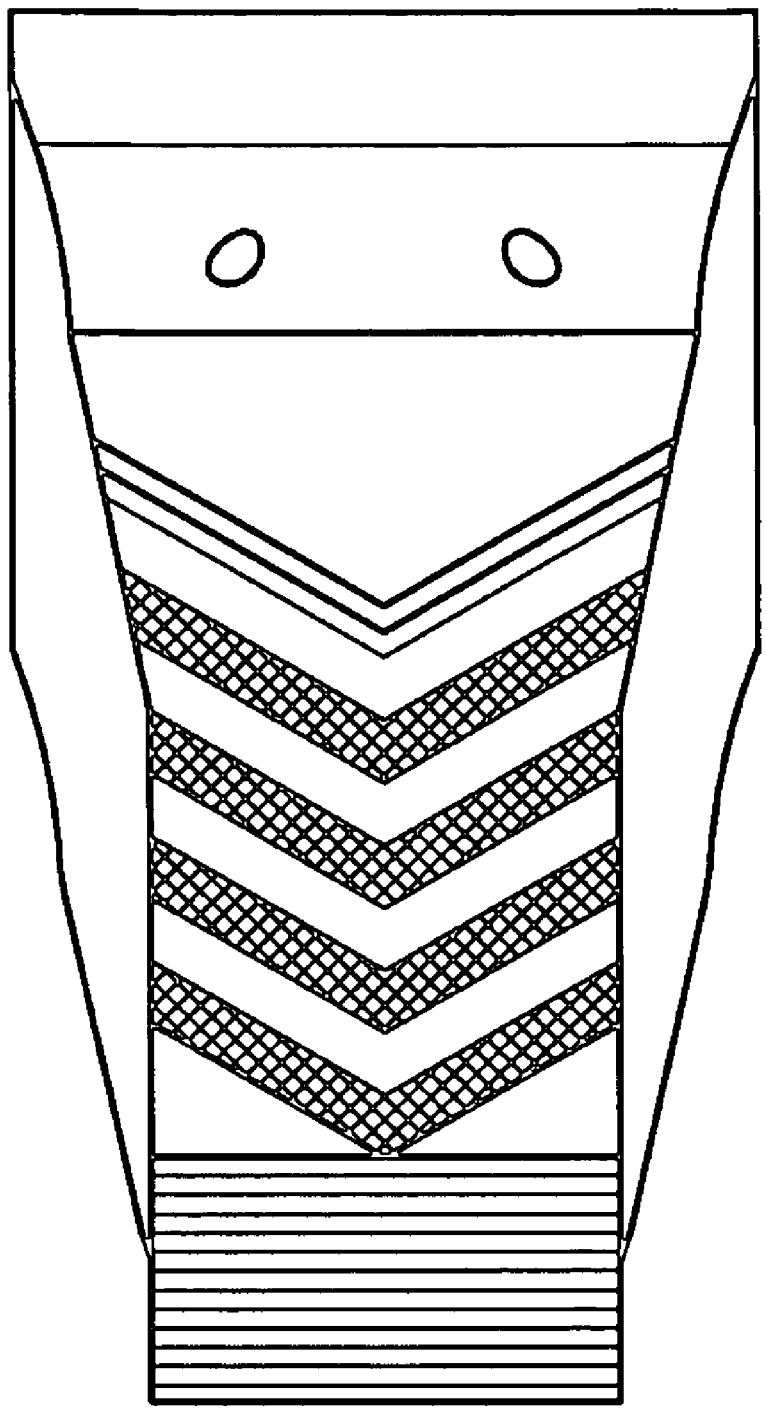
FIG. 10 is an illustration of view G illustrated on FIG. 9.

Now referring to FIG. 10, view G of burner panel 90 is illustrated from FIG. 9. The embodiment of FIG. 9 illustrates a generally roughened surface along groove(s) 96. However, in an alternate embodiment, groove(s) 96 are smooth.

Figure 11:
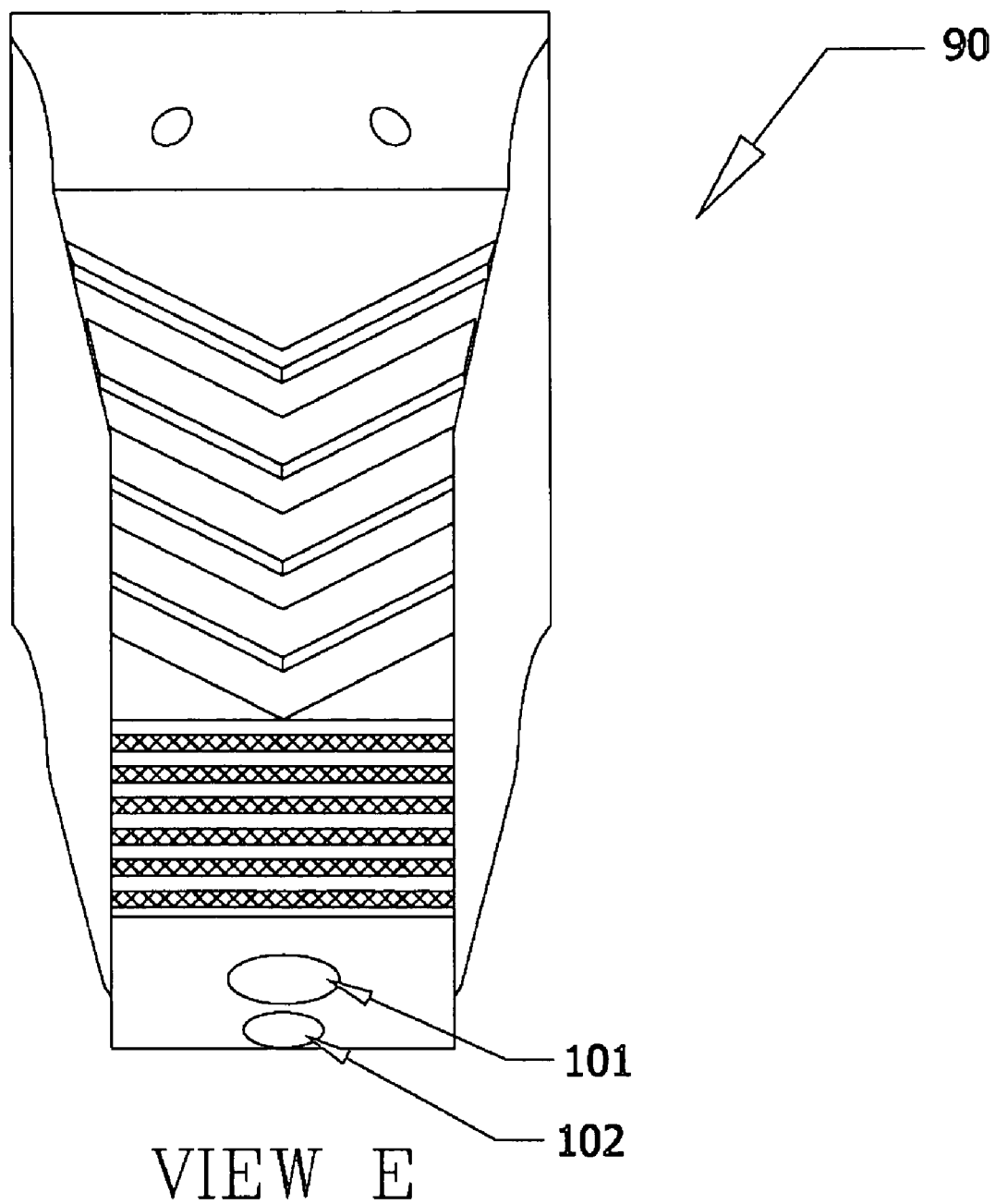
FIG. 11 is an illustration of view E on FIG. 9.

Now referring to FIG. 11, view E from FIG. 9 is illustrated. View E is illustrative of the arrangement of a carbon injector apparatus aperture 102 and an oxygen lance/burner 101 incorporated into burner panel 90.

Figure 12:
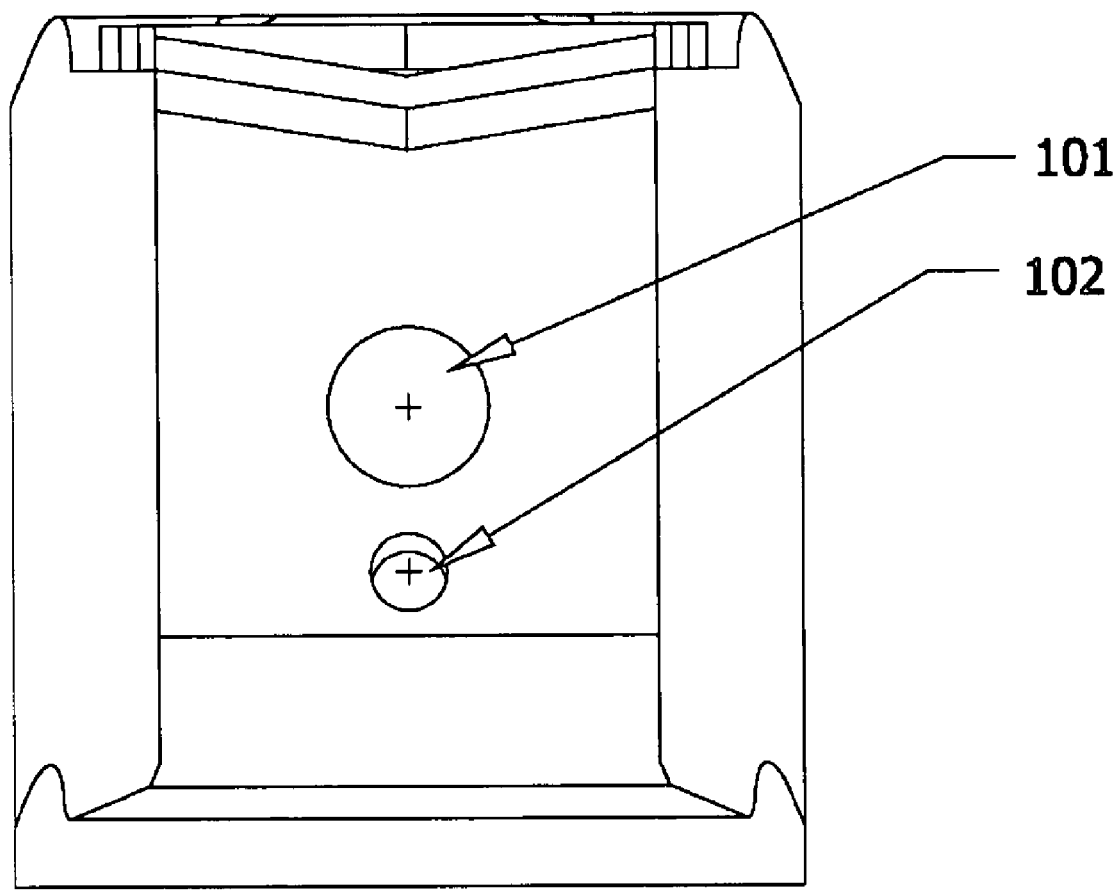
FIG. 12 is an illustration of view D on FIG. 9.

Now referring to FIG. 12, view D of FIG. 9 is illustrated. This view is illustrative of how, in various embodiments, aperture 101 and aperture 102 are at differing angles. The differing angles are commonly referred to as the angle of injection, the relative angle of injection, intersection angle, approach angle, and/or the like. The aperture angles can be varied as needed for a particular application. In typical embodiments, the aperture angles are adjusted or set such that materials and/or energy sources expelled from the apertures meet at about or just above the metal line. In alternate embodiments, the aperture angles are adjusted or set such that materials expelled from the apertures meet at about or just above the foaming slag/sill line. In an alternate embodiment, the aperture angles are adjusted or set such that materials expelled from the apertures do not meet prior to the metal line.

In an alternate embodiment, the relative angle of injection of a burner/lance relative to a carbon injection is such that a discharge from each will intersect at a distance of about 1 meter off the face of the associated burner panel.

Figure 13:
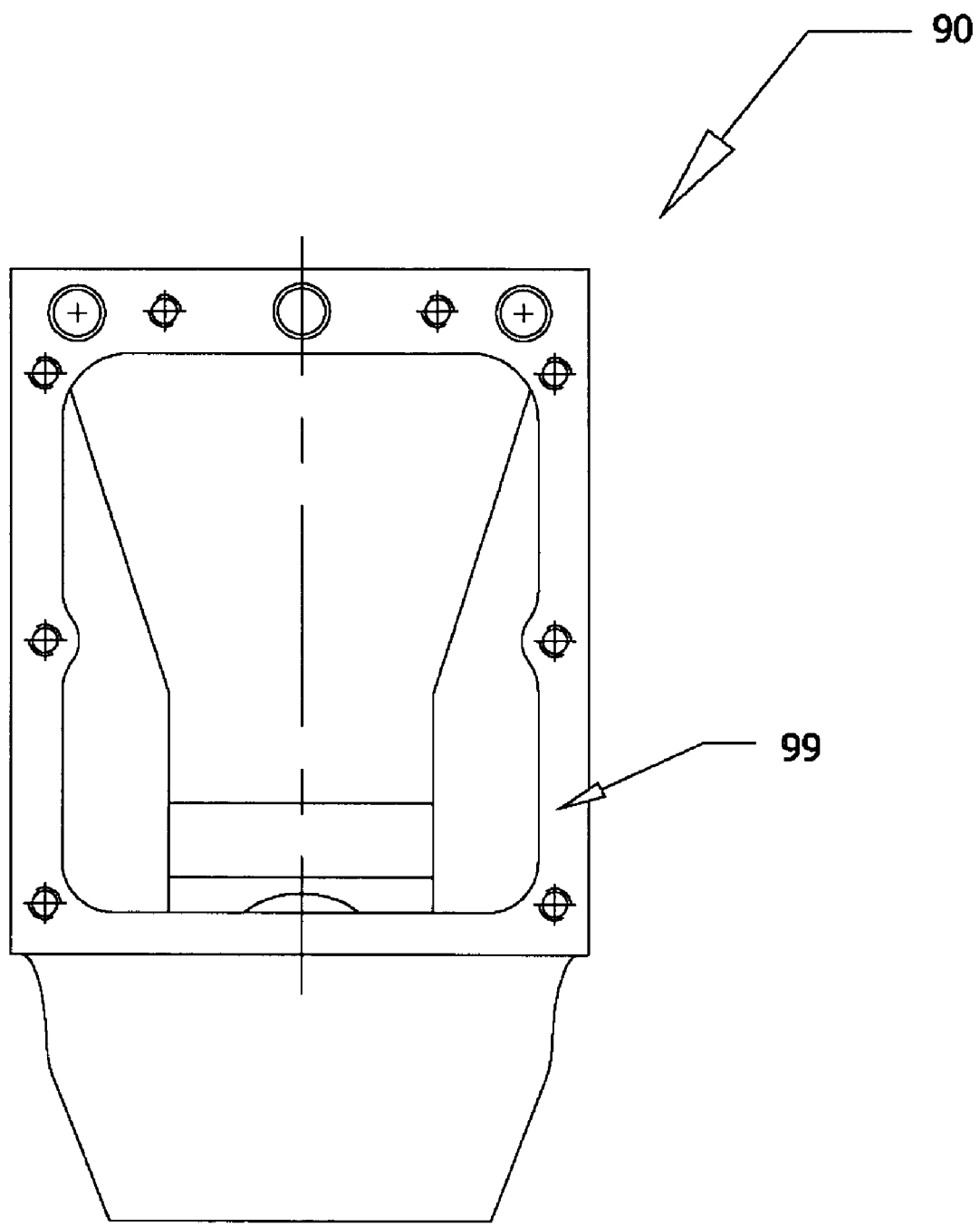
FIG. 13 is an illustration of view F on FIG. 9.

Now referring to FIG. 13, view F from FIG. 9 is illustrated. View F is generally a view from the rear of burner panel 90 illustrating mounting surface 99. In an embodiment, mounting surface 99 is designed as a plug and use system, whereby a panel or a section of the furnace can be removed and burner panel 90 directly inserted without any modifications. Further embodiments contemplate the use of a gap panel, as described herein.

Various embodiments of the present invention further comprise methods of introducing at least one energy source to a furnace through a burner panel. In an embodiment, the at least one energy source is at least one of auxiliary thermal energy to the steel making process, particulate injection for the formation of slag and foamy slag, oxygen injection for the decarburization of the melt, oxygen injection for the formation of foamy slag, or oxygen injection for post combustion burning of carbon monoxide and melting of scrap.

Further embodiments of methods of the present invention A method of injecting thermal energy in a furnace from a tapered burner panel apparatus, the method comprising the steps of injecting at least one energy source into a furnace from a tapered burner panel, wherein the burner panel comprises a water-cooled burner panel comprising shaped grooves; at least one apparatus aperture; and, at lest one apparatus, wherein the water-cooled burner panel extends outwardly from a furnace wall at least to a split line of the furnace and wherein the energy source is at least one of an auxiliary thermal energy, at least one particulate, or oxygen. Further embodiments further comprise the step of injecting at least a second energy source of at least one of an auxiliary thermal energy, at least one particulate, or oxygen. In various embodiments the at least the second energy source intersects at least the first energy source at about the metal line.

Further methods of the present invention comprise a tapered burner panel apparatus, the tapered burner panel apparatus comprising a tapered burner panel, wherein the tapered burner panel comprises a water-cooled tapered burner panel comprising shaped grooves; at least one apparatus aperture; and, at lest one apparatus, wherein the water-cooled tapered burner panel extends outwardly from a furnace wall at least to a split line of the furnace, the method comprising the step of forming shaped grooves along an upper surface of the tapered burner panel whereby when liquid slag and/or foaming slag splashes on the upper surface the shaped grooves channel the slag along at least a portion of the upper surface whereby the water-cooled tapered burner panel cools the slag into an at least partially solidified slag. In various methods, the efficiency of the burner panel is increased by at least about 10%.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes to the claims which come within the meaning and range of equivalency of the claims are to be embraced within their scope. Further, all published documents, patents, and applications mentioned herein are hereby incorporated by reference, as if presented in their entirety.

What is claimed is:

1. A tapered burner panel apparatus mounted within a furnace, the burner panel apparatus comprising:
   a water-cooled tapered burner panel disposed within an opening in a wall of the furnace, the furnace wall opening having a bottom surface upon which the water-cooled tapered burner panel rests, the water-cooled tapered burner panel having a vertically oriented mounting surface, a downwardly sloping tapered upper surface that extends into the furnace, a first tapered sidewall surface that extends into the furnace, a second tapered sidewall surface that extends into the furnace, a downwardly sloping tapered underside surface that extends into the furnace, a front side surface that is disposed within the furnace, and shaped grooves, wherein:
   the mounting surface having top, bottom, and first and second side edges; and
   the upper, underside, and first and second sidewall surfaces extending from the top, bottom, and first and second side edges of the mounting surface, respectively; and
   at least one apparatus aperture positioned in the front side surface; and
   at least one apparatus positioned within the at least one apparatus aperture,
   wherein the at least one aperture extends to below the bottom surface of the furnace wall opening; and wherein the apparatus is at least one of an auxiliary thermal energy source, a particulate injector, or an oxygen injector.

2. The tapered burner panel apparatus of claim 1, wherein the at least one apparatus comprises first and second apparatuses.

3. The tapered burner panel apparatus of claim 1, wherein the at least one apparatus aperture comprises first and second apparatus apertures and the at least one apparatus comprises first and second apparatuses that are positioned within the first and second apparatus apertures, respectively.

4. The tapered burner panel apparatus of claim 1, wherein:
   said tapered burner panel apparatus further comprises a plurality of surfaces exposed to an interior of the furnace;
   the plurality of surfaces comprises the upper, underside, front side, and first and second sidewall surfaces, and wherein a substantial portion of said plurality of surfaces is other than orthogonal to the furnace's metal line.

5. The tapered burner panel apparatus of claim 4, wherein only the mounting surface and the first and second sidewall surfaces of said plurality of surfaces are orthogonal to the furnace's metal line.

6. The tapered burner panel apparatus of claim 1, wherein the shaped groove is on the upper surface of the burner panel.

7. The tapered burner panel apparatus of claim 1, wherein the burner panel apparatus is a plug and use burner panel apparatus.

8. The tapered burner panel apparatus of claim 1, wherein the first and second tapered sidewall surfaces taper inwardly.

9. The tapered burner panel apparatus of claim 1, wherein at least one of the at least one aperture extends to a split line of the furnace.

10. A tapered burner panel apparatus disposed within an opening in a wall of a furnace, the furnace wall opening having a bottom surface upon which the water-cooled tapered burner panel rests, the burner panel apparatus comprising:
    a vertically oriented mounting surface having upper, lower, and first and second side edges, the mounting surface configured to be mounted in an opening of a furnace wall;
    an upper surface having rear, front and first and second side edges, the upper surface extending from the upper edge of the mounting surface at the rear side edge thereof;
    an underside surface having rear, front and first and second side edges, the underside surface extending from the lower edge of the mounting surface at the rear side edge thereof;
    a first tapered sidewall surface having upper, lower, rear, and front edges, the first tapered sidewall surface extending from the first side edge of the mounting surface and between the first side edges of the upper and underside surfaces;
    a second tapered sidewall surface having upper, lower, rear, and front edges, the second tapered sidewall surface extending from the second side edge of the mounting surface and between the second side edges of the upper and underside surfaces;
    a front surface having upper, lower, and first and second side edges, the front surface extending between the front edges of the upper, underside, and first and second tapered sidewall surfaces;
    an apparatus aperture disposed within the front surface; and an apparatus positioned within the apparatus aperture, wherein the apparatus is at least one of an auxiliary thermal energy source, a particulate injector, or an oxygen injector, wherein:
    the upper surface slopes downwardly away from the upper edge of the mounting surface at an acute angle with respect to horizontal;
    the lower surface slopes downwardly away from the lower edge of the mounting surface at an obtuse angle with respect to horizontal; and
    the apparatus aperture extends to below the bottom surface of the furnace wall opening.

11. The tapered burner panel apparatus of claim 10, wherein the front surface slopes downwardly toward the mounting surface.

12. The tapered burner panel apparatus of claim 10, wherein the front surface has a smaller surface area than a surface area defined by the upper, lower, and first and second side edges of the mounting surface.

13. The tapered burner panel apparatus of claim 11, wherein, out of all of the upper, underside, front, and first and second sidewall surfaces, only the first and second sidewall surfaces are oriented perpendicular to that of the mounting surface.

* * * * *